United States Patent
Toyama

(10) Patent No.: US 6,597,512 B2
(45) Date of Patent: Jul. 22, 2003

(54) ROD LENS ARRAY FOR LINE SCANNING

(75) Inventor: Minoru Toyama, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 138 days.

(21) Appl. No.: 09/960,534

(22) Filed: Sep. 21, 2001

(65) Prior Publication Data

US 2002/0063964 A1 May 30, 2002

(30) Foreign Application Priority Data

Sep. 22, 2000 (JP) ....................................... 2000-289306
Oct. 3, 2000 (JP) ....................................... 2000-303475

(51) Int. Cl.[7] ............................................... G02B 3/00
(52) U.S. Cl. ..................................... 359/654; 359/619
(58) Field of Search ................................ 359/619–620, 359/622–623, 652, 654, 197, 201, 204, 209–210; 385/124

(56) References Cited

U.S. PATENT DOCUMENTS

| | | | | |
|---|---|---|---|---|
| 5,465,265 A | * | 11/1995 | Ota | 372/101 |
| 5,978,146 A | * | 11/1999 | Kittaka et al. | 359/652 |
| 6,088,164 A | | 7/2000 | Fukasawa | 359/619 |
| 6,429,977 B2 | * | 8/2002 | Kittaka | 359/654 |

FOREIGN PATENT DOCUMENTS

JP 10-309826 11/1998

OTHER PUBLICATIONS

Matsushita et al., 1980, *Applied Optics*, 19:7, "Unevenness of illuminace caused by gradient–index fiber arrays".
Toyama et al., 1982, *Applied Optics*, 21:6, "Luminous intensity of a gradient–index lens array".

* cited by examiner

*Primary Examiner*—Jordan M. Schwartz
(74) *Attorney, Agent, or Firm*—Merchant & Gould P.C.

(57) ABSTRACT

A rod lens array for line scanning is provided that can reduce the degradation of image quality (i.e., vertical stripes (streaks) in the sub-scanning direction of an output image) caused by a periodic irregularity in the light quantity, considering an angular aperture and the positional deviation of an image line in the sub-scanning direction. A rod lens array for one-to-one imaging is used as the rod lens array for line scanning, including a plurality of columnar rod lenses having a refractive index distribution in the radial direction that are arranged in one row in the main scanning direction with their optical axes in parallel. The effective overlapping degree m is in the range defined by $$(1.55+0.5f)D/d \leq m \leq (1.80+0.5f)D/d \qquad \text{Eq. 37}$$

where d is the lens diameter of the rod lens and D is the array pitch of the rod lenses.

6 Claims, 15 Drawing Sheets

ROD LENS ARRAY FOR LINE SCANNING

BACKGROUND OF THE INVENTION

1. Field of the Invention

The present invention relates to a rod lens array for line scanning as an optical system for line scanning used in a scanner, printer, or the like.

2. Description of the Related Art

A rod lens array has been used widely as an optical system for line scanning mainly in consideration of cost. The optical system for line scanning is employed in a scanner, a printer that includes an LED array optical system as a light source, or the like. The rod lens array includes a plurality of rod lenses that have a refractive index distribution in the radial direction and are arranged in rows with their optical axes in parallel. In such a case, an overlapping degree m is set while considering the balance between the periodic light quantity irregularity and the resolution, which is given by $$m = X_0/2r_0 \qquad \text{Eq. 10}$$

where $r_0$ is the radius of the rod lens and $X_0$ is the image radius (field of view) that the single rod lens projects onto an image plane. Here, $X_0$ is defined as $X_0 = -r_0/\cos(Z_0\pi/P)$, where $Z_0$ is the length of the rod lens and P is the one-pitch length thereof.

The resolution is degraded with increases in the overlapping degree m and the periodic light quantity irregularity is increased with decreases in that degree. In general, a relatively large overlapping degree m has been adapted in lens design to suppress the periodic light quantity irregularity that causes vertical stripes (streaks) in the sub-scanning direction of an output image. This is because suppression of the periodic light quantity irregularity is the main purpose of the rod lens array design.

A printer using an LED array optical system as a light source corrects the quantity of light from each of the point light sources so as to eliminate the periodic light quantity irregularity of a rod lens array. Also, a scanner performs input correction (shading correction) so as to eliminate the periodic light quantity irregularity of a rod lens array. The progress in digital data processing technology enables these corrections, and thus the periodic light quantity irregularity can be corrected easily by about 10%.

With a steady increase in the resolution of equipment, optical printers are beginning to shift their resolution from 600 dpi to 1200 dpi.

The optical system for line scanning causes a larger periodic light quantity irregularity, compared with an optical system for field scanning used in copiers or the like. Therefore, it is desirable that the overlapping degree m of a rod lens array for line scanning, defined by Equation 10, is set so as to minimize the periodic light quantity irregularity.

The optical system for line scanning may cause the positional deviation of an image line in the sub-scanning direction (i.e., the direction perpendicular to the main scanning direction). Therefore, the design for preventing an increase in the periodic light quantity irregularity due to such positional deviation also is desirable.

Conventionally, the relationship between the overlapping degree m and the periodic light quantity irregularity has been calculated according to a method disclosed in APPLIED OPTICS/Vol. 19, No. 7/1 Apr. 1980, APPLIED OPTICS/Vol. 21, No. 6/15 March 1982, or the like.

However, it is difficult to achieve a rod lens array for line scanning that provides high brightness and resolution when a relatively large overlapping degree m is adapted in the lens design.

Moreover, the methods disclosed in the above documents assume that the light quantity distribution of rod lenses on an image plane is elliptical. This leads to the conclusion that the periodic light quantity irregularity does not change depending on the rod lens arrays having different angular apertures. Here, the angular aperture is a maximum angle of incidence and indicates the range over which the lenses can accept light.

Thus, the above conventional methods cannot determine the range of the overlapping degree m that is not affected by the positional deviation of an image line in the sub-scanning direction for each rod lens array having a different angular aperture.

SUMMARY OF THE INVENTION

Therefore, with the foregoing in mind, it is an object of the present invention to provide a rod lens array for line scanning that can provide high brightness and resolution and suppress the periodic light quantity irregularity to less than 10%.

The present invention also has an object of providing a rod lens array for line scanning that can reduce the degradation of image quality (i.e., vertical stripes (streaks) in the sub-scanning direction of an output image) caused by the periodic light quantity irregularity while considering an angular aperture and the positional deviation of an image line in the sub-scanning direction.

A rod lens array for line scanning according to a first configuration of the present invention includes a plurality of rod lenses having a refractive index distribution in the radial direction that are arranged in one row in the main scanning direction with their optical axes in parallel. An overlapping degree m is in the range defined by $$(1.55+0.5j)D/d \leq m \leq (1.80+0.5j)D/d \qquad \text{Eq. 11}$$

where d is a lens diameter of the rod lenses, D is an array pitch of the rod lenses and j is zero or a positive integer, and the overlapping degree m is given by $m = X_0/d$, where $X_0$ is the image radius that a single rod lens projects onto an image plane.

A rod lens array for line scanning according to a second configuration of the present invention includes a plurality of rod lenses having a refractive index distribution in the radial direction that are arranged in two rows in the main scanning direction with their optical axes in parallel. An overlapping degree m is in the range defined by $$(0.90+0.5j)D/d \leq m \leq (1.08+0.5j)D/d \qquad \text{Eq. 12}$$

where d is a lens diameter of the rod lenses, D is an array pitch of the rod lenses and j is zero or a positive integer, and the overlapping degree m is given by $m = X_0/d$, where $X_0$ is the image radius that a single rod lens projects onto an image plane.

A rod lens array for line scanning according to a third configuration of the present invention includes a plurality of rod lenses having a refractive index distribution in the radial direction that are arranged in three rows in the main scanning direction with their optical axes in parallel. An overlapping degree m is in the range defined by $$(1.30+0.5j)D/d \leq m \leq (1.60+0.5j)D/d \qquad \text{Eq. 13}$$

where d is a lens diameter of the rod lenses, D is an array pitch of the rod lenses and j is zero or a positive integer, and the overlapping degree m is given by $m = X_0/d$, where $X_0$ is the image radius that a single rod lens projects onto an image plane.

According to the first, second or third configuration of the rod lens array for line scanning, it is possible to provide a rod lens array for line scanning that can reduce the degradation of image quality (i.e., vertical stripes (streaks) in the sub-scanning direction of an output image) caused by the periodic light quantity irregularity.

A rod lens array for line scanning according to a fourth configuration of the present invention includes a plurality of rod lenses having a refractive index distribution in the radial direction that are arranged in one row in the main scanning direction with their optical axes in parallel. An overlapping degree m is in the ranges defined by $$1.57 D/d \leq m \leq 1.70 D/d \qquad \text{Eq. 14}$$

$$2.04 D/d \leq m \leq 2.42 D/d \qquad \text{Eq. 15}$$

where d is a lens diameter of the rod lenses and D is an array pitch of the rod lenses, and the overlapping degree m is given by $m = X_0/d$, where $X_0$ is the image radius that a single rod lens projects onto an image plane.

A rod lens array for line scanning according to a fifth configuration of the present invention includes a plurality of rod lenses having a refractive index distribution in the radial direction that are arranged in an even number of rows of more than one in the main scanning direction with their optical axes in parallel. An overlapping degree m is in the ranges defined by $$0.89 D/d \leq m \leq 0.95 D/d \qquad \text{Eq. 16}$$

$$1.10 D/d \leq m \leq 1.28 D/d \qquad \text{Eq. 17}$$

where d is a lens diameter of the rod lenses and D is an array pitch of the rod lenses, and the overlapping degree m is given by $m = X_0/d$, where $X_0$ is the image radius that a single rod lens projects onto an image plane.

A rod lens array for line scanning according to a sixth configuration of the present invention includes a plurality of rod lenses having a refractive index distribution in the radial direction that are arranged in an odd number of rows of more than two in the main scanning direction with their optical axes in parallel. An overlapping degree m is in the ranges defined by $$1.44 D/d \leq m \leq 1.56 D/d \qquad \text{Eq. 18}$$

$$1.80 D/d \leq m \leq 2.13 D/d \qquad \text{Eq. 19}$$

where d is a lens diameter of the rod lenses and D is an array pitch of the rod lenses, and the overlapping degree m is given by $m = X_0/d$, where $X_0$ is the image radius that a single rod lens projects onto an image plane.

According to the fourth, fifth, or sixth configuration of the rod lens array for line scanning, it is possible to provide a rod lens array for line scanning that can provide high brightness and resolution and suppress the periodic light quantity irregularity to less than 10%.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described more specifically by way of embodiments.

First Embodiment

Figure 1:
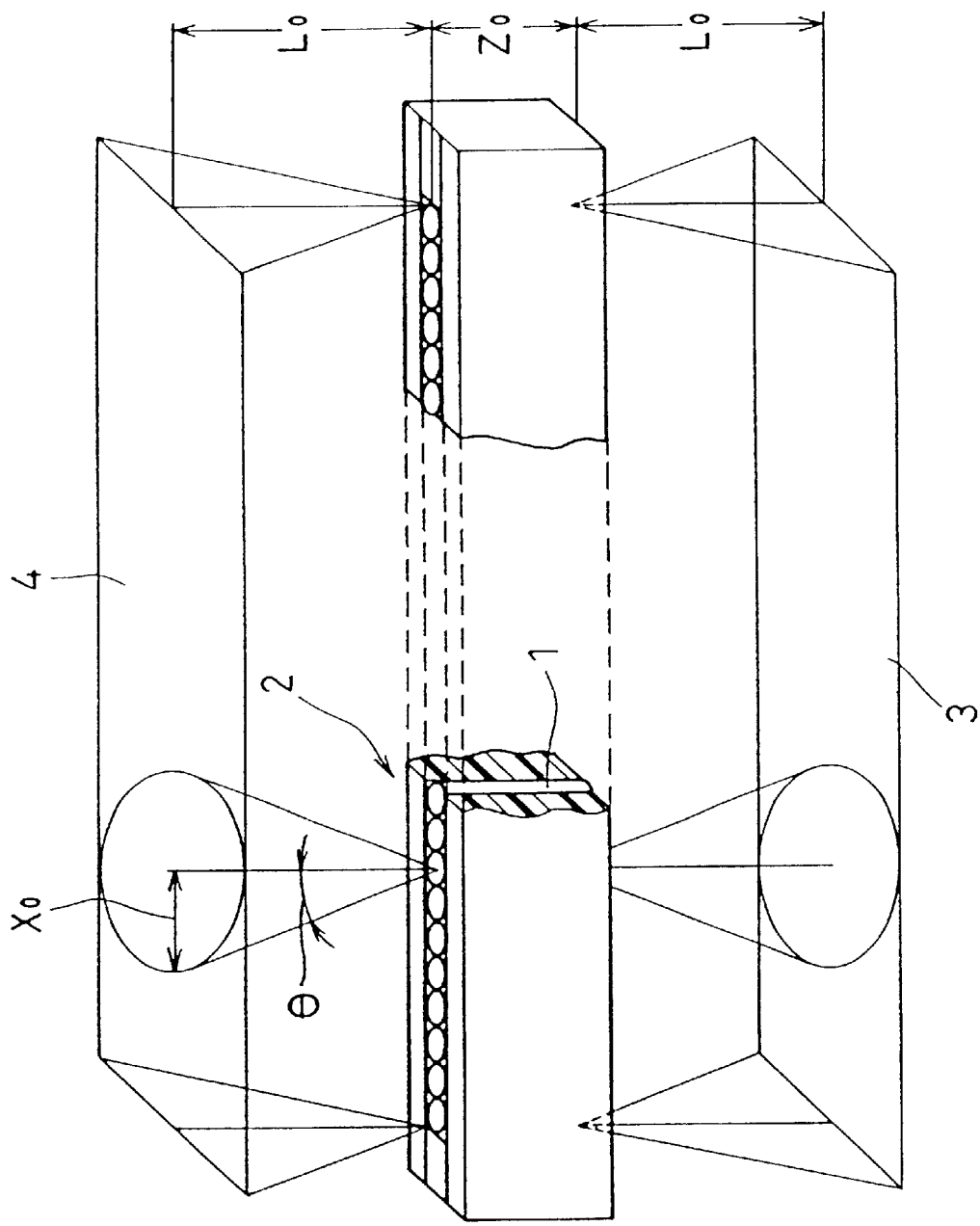
FIG. 1 is a perspective view showing a rod lens array for line scanning according to a first embodiment of the present invention.
Figure 2:
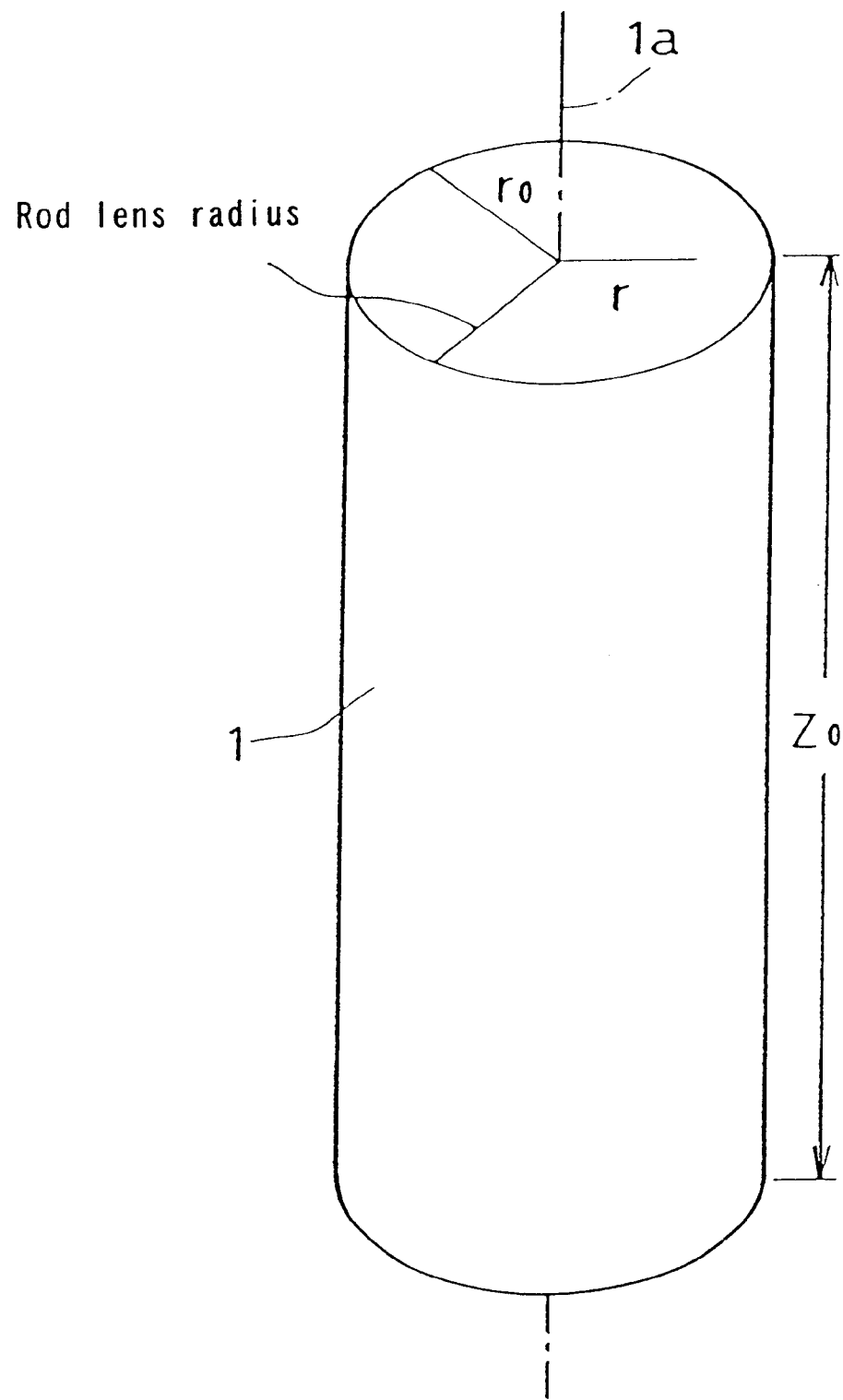
FIG. 2 is a perspective view showing a rod lens used in a rod lens array for line scanning according to embodiments of the present invention.

FIG. 1 is a perspective view showing a rod lens array for line scanning according to a first embodiment of the present invention. FIG. 2 is a perspective view showing a rod lens used in the rod lens array.

As shown in FIGS. 1 and 2, this embodiment employs a rod lens array 2 for one-to-one imaging as the rod lens array for line scanning. In the rod lens array 2, a plurality of columnar rod lenses 1 having a refractive index distribution in the radial direction are arranged in one row in the main scanning direction with their optical axes 1a in parallel. Here, the "main scanning direction" is designated as the longitudinal direction of the rod lens array 2. A manuscript plane 3 and an image plane 4 are located on opposed sides of the rod lens array 2. The line scanning system utilizes the brightest image on the centerline of the rod lens array 2. In other words, an image can be scanned by lines.

Figure 3:
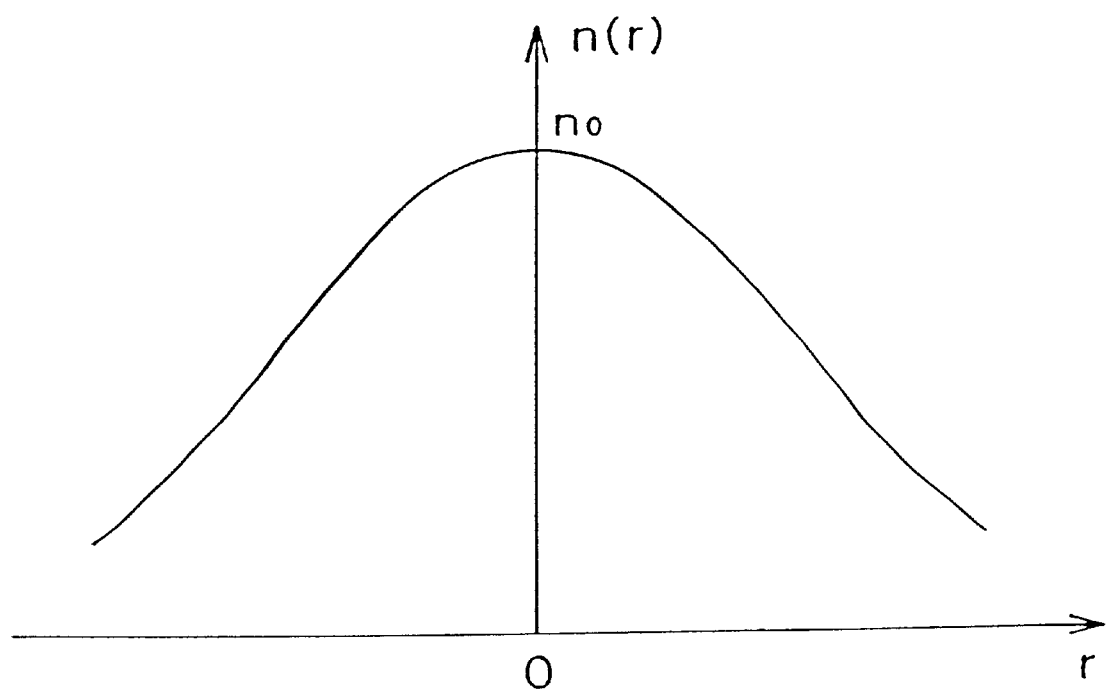
FIG. 3 is a refractive index distribution curve of the rod lenses used in a rod lens array for line scanning according to embodiments of the present invention.

As shown in FIG. 3, the refractive index n of the rod lenses 1 is distributed in the radial direction, which is expressed by $$n(r)^2 = n_0^2 \cdot \{1 - (g \cdot r)^2 + h_4 \cdot (g \cdot r)^4 + h_6 \cdot (g \cdot r)^6 + h_8 \cdot (g \cdot r)^8\} \quad \text{Eq. 20}$$

where r is a radial distance from the optical axis $1a$ of the rod lens 1, n(r) is the refractive index at the radial distance r from the optical axis $1a$ of the rod lens 1, $n_0$ is the refractive index at the optical axis $1a$ of the rod lens 1 (center refractive index), and g, $h_4$, $h_6$ and $h_8$ are coefficients of the refractive index distribution.

It is desirable that the radius $r_0$ of the rod lens 1 is in the range of $0.05 \text{ mm} \leq r_0 \leq 0.60 \text{ mm}$.

Lenses having a small $r_0$ can provide high resolution more easily because the amount of blurred image caused by various aberrations of the rod lenses 1 increases in proportion to the size of the entire lens. However, when $r_0$ is smaller than 0.05 mm, there is difficulty in producing and assembling those rod lenses 1. When the radius $r_0$ of the effective lens portion of each rod lens 1 is larger than 0.60 mm, the aberrations of the rod lens array 2 become too large.

The obtainable value of the refractive index $n_0$ at the optical axis $1a$ of the rod lens 1 (center refractive index) depends on the rod lens material (glass or synthetic resin) and is in the range of $1.4 \leq n_0 \leq 1.8$.

The brightness of the rod lenses 1 depends on the dimensionless factor $g \cdot r_0$ or an angular aperture (i.e., a maximum angle of incidence) that indicates the range over which the lenses can accept light. The angular aperture θ (°) is expressed by $$\theta = (n_0 \cdot g \cdot r_0)/(\pi/180). \quad \text{Eq. 21}$$

It is desirable that the dimensionless factor $g \cdot r_0$ is in the range of $0.04 \leq g \cdot r_0 \leq 0.27$. When $g \cdot r_0$ is smaller than 0.04, the image may become too dark and the time for scanning etc. is long. When $g \cdot r_0$ is larger than 0.27, the influence of field curvature and astigmatism may become too large and the resolving power is reduced.

The desirable range of $g \cdot r_0$ corresponds to $4° \leq \theta \leq 24°$, e.g., when the center refractive index of $n_0 = 1.60$.

Figure 4:
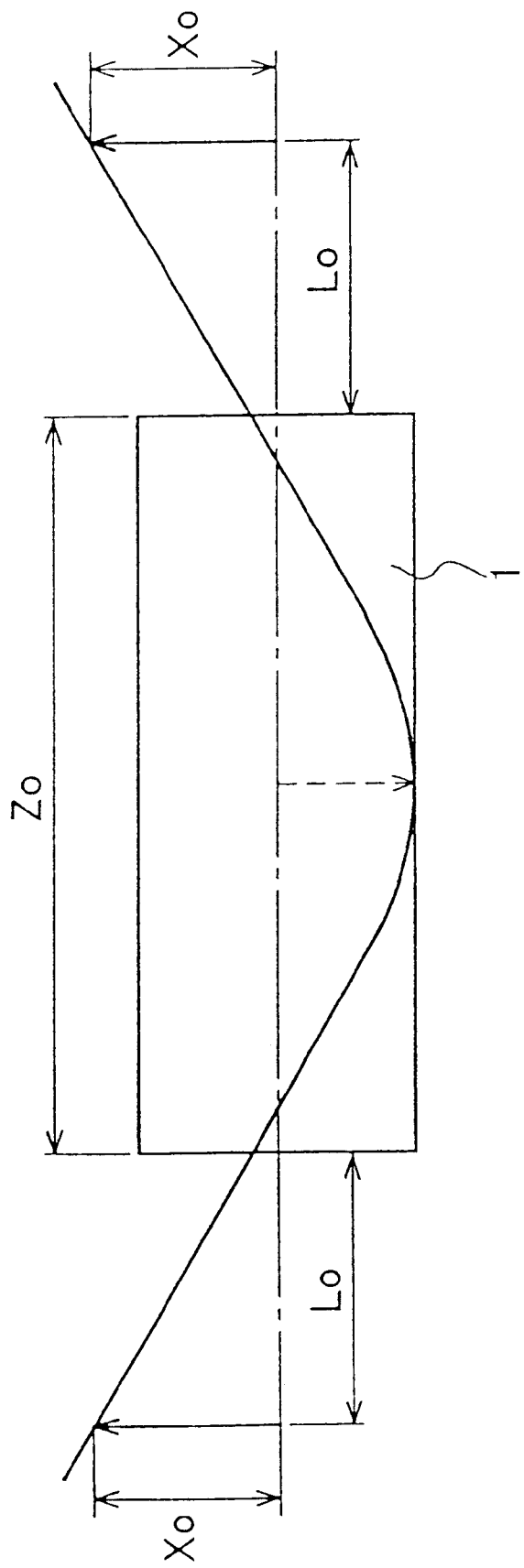
FIG. 4 is a schematic view showing the image formation by a rod lens used in a rod lens array for line scanning according to embodiments of the present invention.

To attain erected images as shown in FIG. 4, the ratio of the length $Z_0$ of the rod lens 1 to the one-pitch length P ($=2\pi/g$) of the rod lens 1, i.e., $Z_0/P$, has to be in the range of $0.5 < Z_0/P < 1.0$.

The distance $L_o$ between the end surface (lens surface) of the rod lens array 2 and the manuscript plane 3 and that between the end surface (lens surface) of the rod lens array 2 and the image plane 4 (see FIG. 1) are expressed by $$L_0 = -(1/(n_0 \cdot g)) \cdot \tan(Z_0 \pi/P). \quad \text{Eq. 22}$$

Here, the distance $(Z_0 + 2L_0)$ between the manuscript plane 3 and the image plane 4 is called "conjugate length (TC)."

Figure 5:
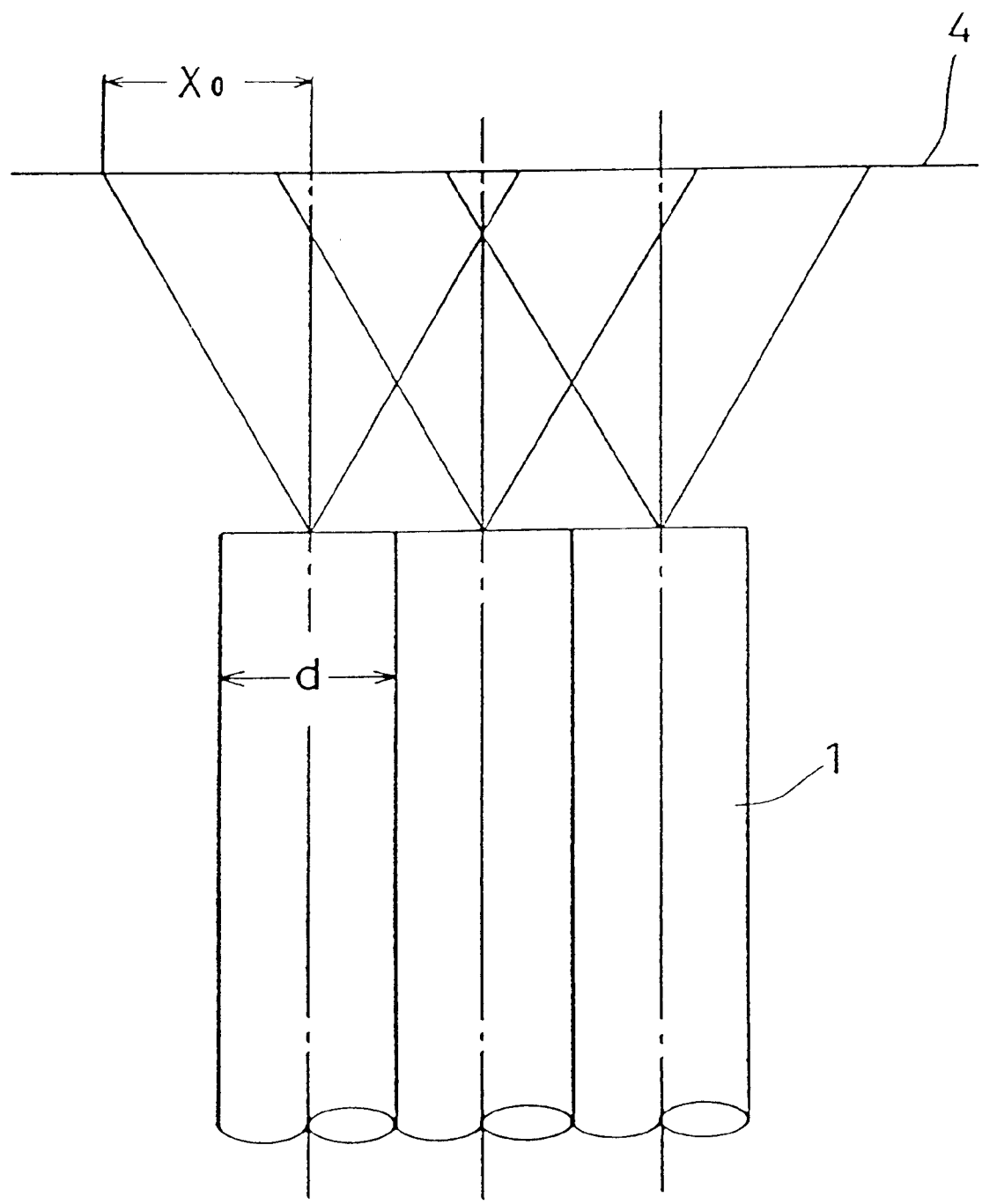
FIG. 5 is a schematic view showing the image composition by a plurality of rod lenses used in a rod lens array for line scanning according to embodiments of the present invention.

In the above rod lens array 2, a compound image is formed by a plurality of rod lenses 1 on the image plane 4, as shown in FIG. 5. Therefore, it is convenient to use a dimensionless factor representing the amount of overlap, i.e., a so-called "overlapping degree." This overlapping degree m is expressed by $$m = X_0/d \quad \text{Eq. 23}$$

where d is the lens diameter of the rod lens 1 ($=2r_0$) and $X_0$ is the image radius (field of view) that the single rod lens 1 projects onto the image plane 4. Here, $X_0$ is defined by $X_0 = -r_0/\cos(Z_0 \pi/P)$.

Figure 6:
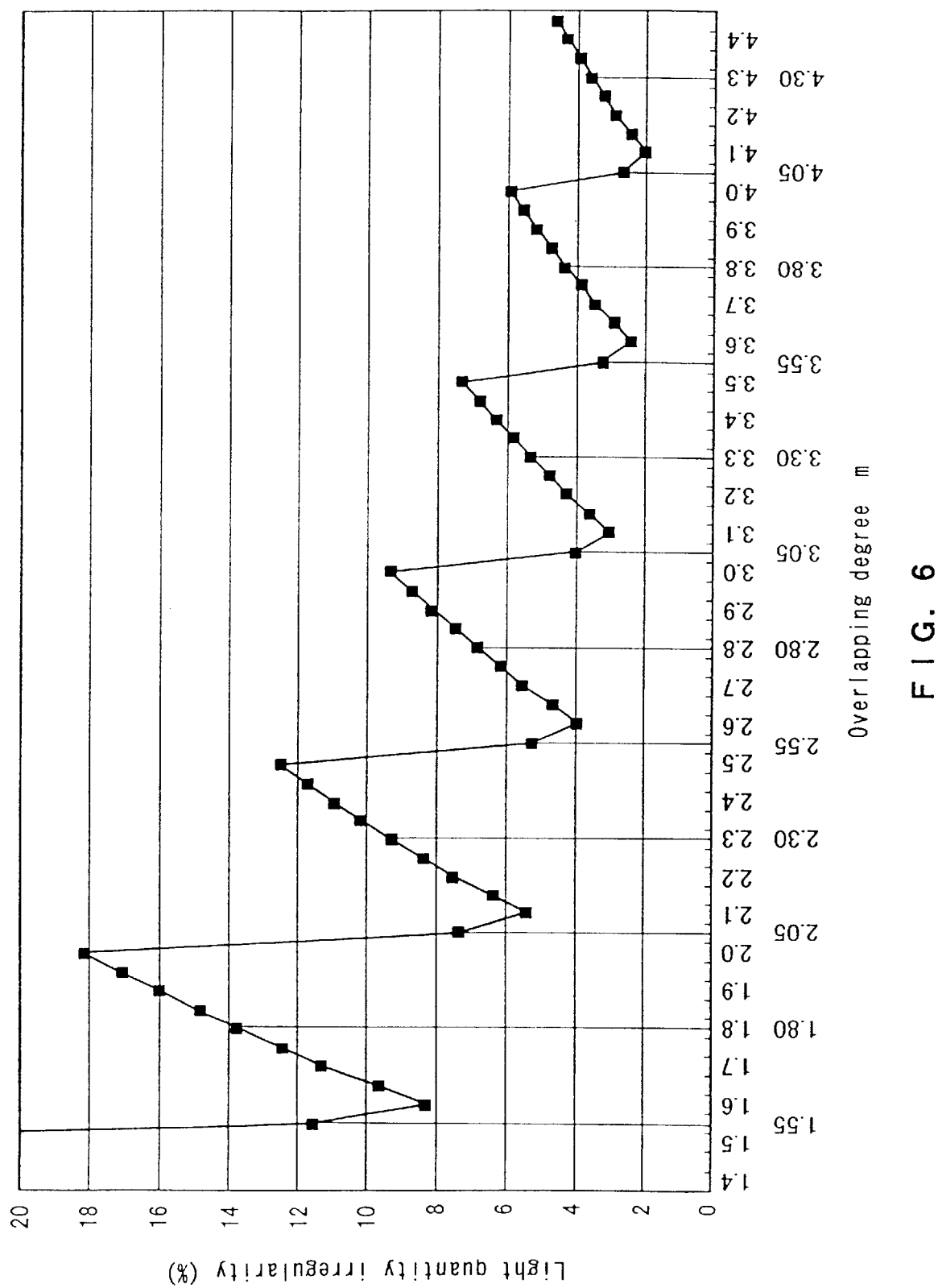
FIG. 6 shows the calculation of the periodic light quantity irregularity of the rod lens array according to the first embodiment that includes rod lenses having an angular aperture $\theta$ of 12°.
Figure 7:
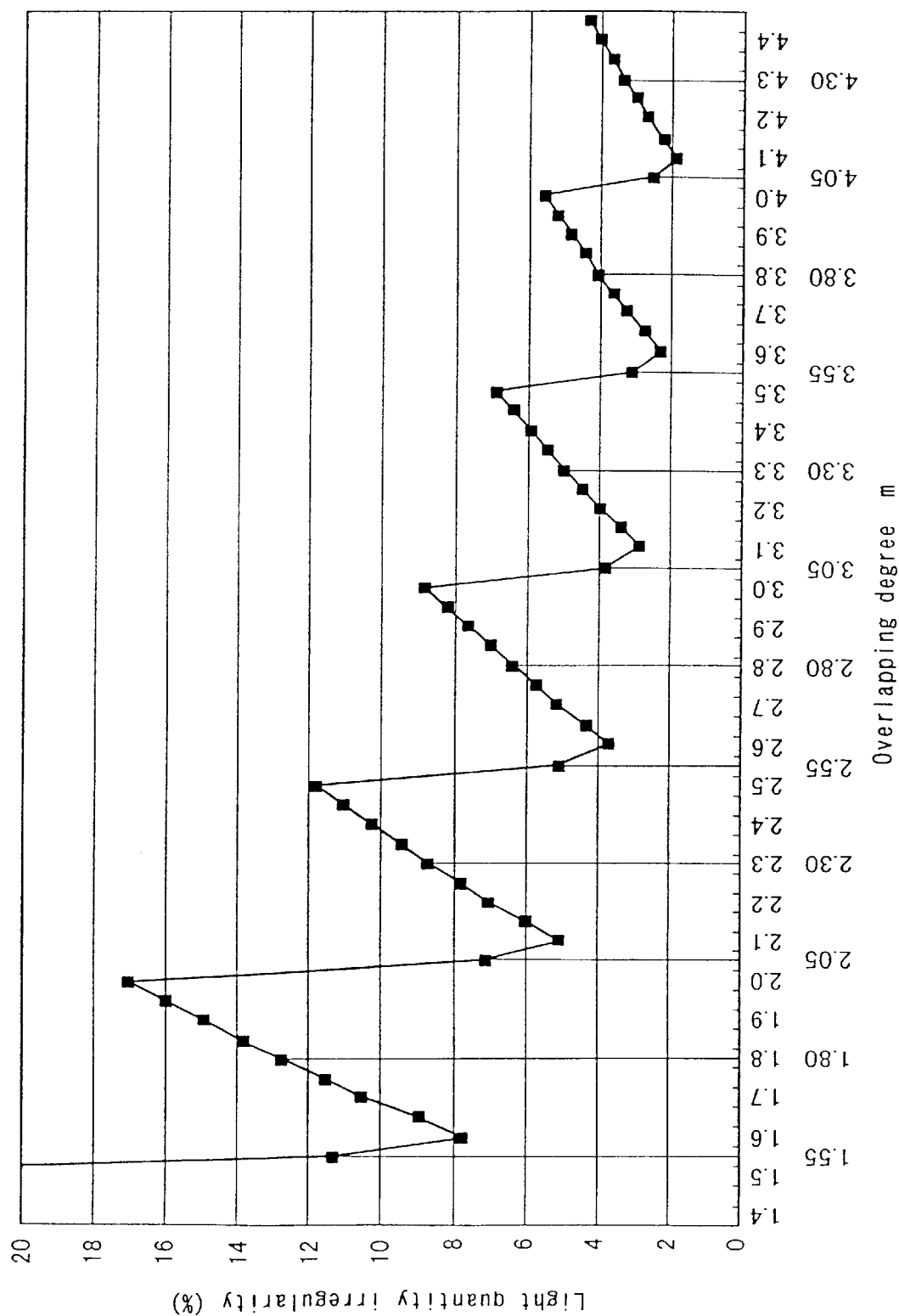
FIG. 7 shows the calculation of the periodic light quantity irregularity of the rod lens array according to the first embodiment that includes rod lenses having an angular aperture $\theta$ of 17°.
Figure 8:
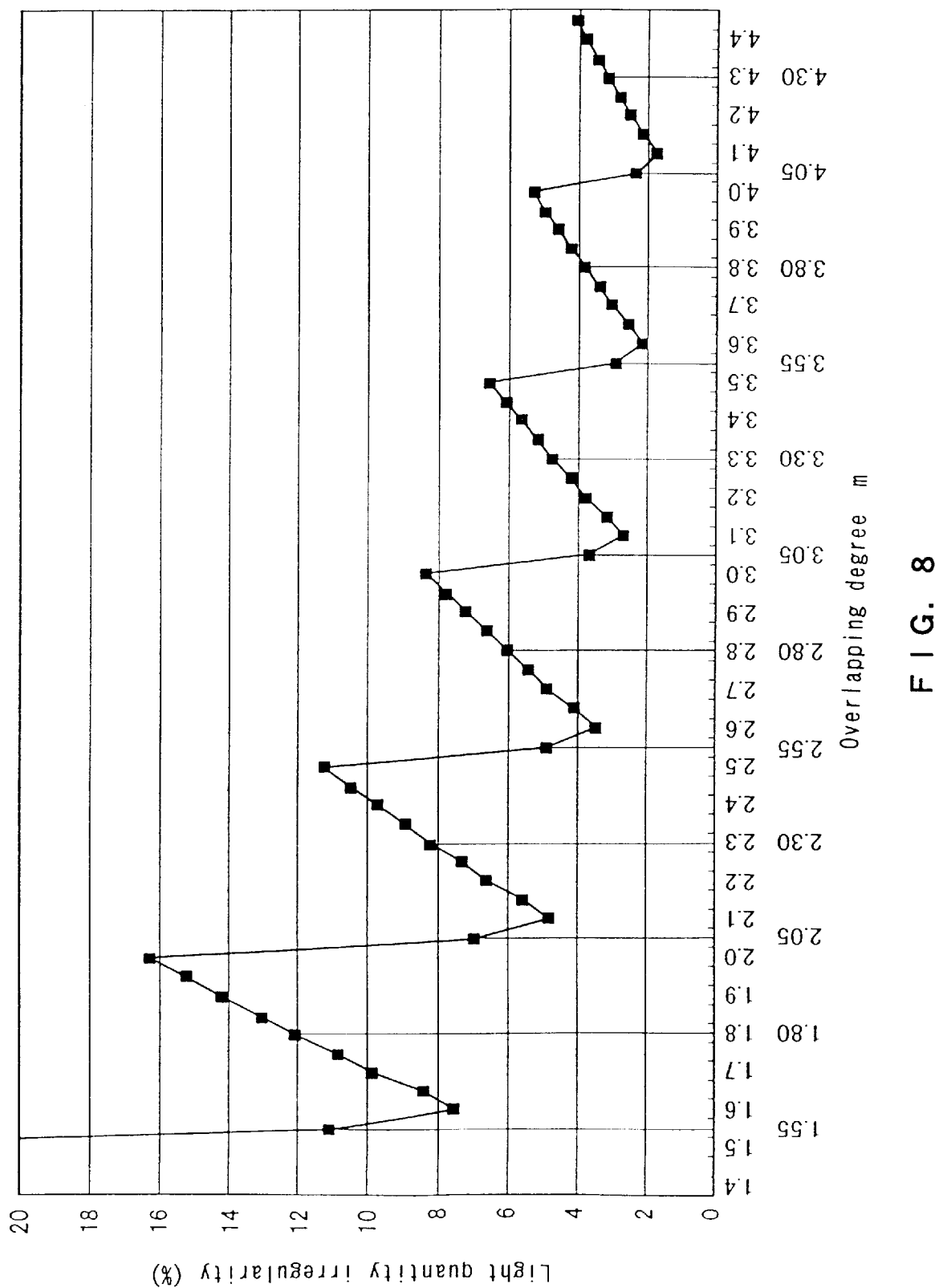
FIG. 8 shows the calculation of the periodic light quantity irregularity of the rod lens array according to the first embodiment that includes rod lenses having an angular aperture $\theta$ of 20°.

Using the rod lens arrays 2 with the above configuration that include the rod lenses 1 having angular apertures θ of 12°, 17° and 20°, respectively, the present inventor calculated the periodic light quantity irregularity ΔE with respect to the overlapping degree m by actual ray tracing and made evaluations. The present inventor carried out the above calculation also when an image line deviates in the sub-scanning direction (i.e., the direction perpendicular to the main scanning direction) and made evaluations. FIGS. 6 to 8 show the results, where the rod lenses 1 having an angular aperture θ of 12° were used in FIG. 6, those having an angular aperture θ of 17° in FIG. 7, and those having an angular aperture θ of 20° in FIG. 8. The calculation shown in each of FIGS. 6 to 8 also includes the result obtained when the image line deviates in the sub-scanning direction.

Figure 9:
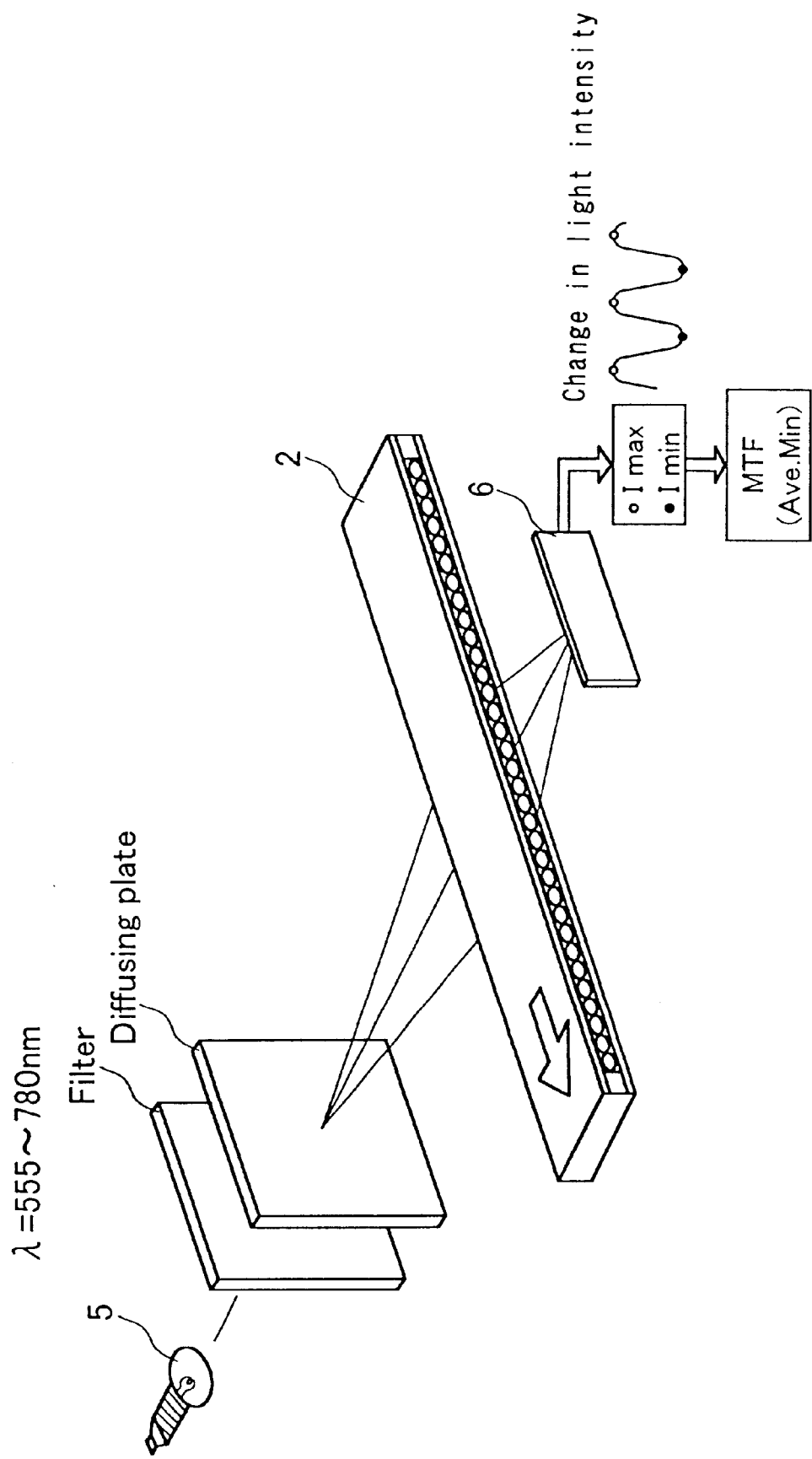
FIG. 9 is a perspective view showing a measurement system of the periodic light quantity irregularity of a rod lens array according to embodiments of the present invention.

The periodic light quantity irregularity ΔE may be measured experimentally in the following manner. As shown in FIG. 9, light from a diffuse surface illuminant 5, e.g., a halogen lamp, is incident uniformly on the rod lens array 2. The light emitted from the rod lens array 2 is detected with a CCD image sensor 6 to determine a maximum $I_{max}$ and a minimum $I_{min}$ of fluctuations in the light intensity in the array direction, and thus an average $I_{ave}$ of the light intensity fluctuations is obtained. Consequently, the periodic light quantity irregularity ΔE is given by $$\Delta E = 100(I_{max} - I_{min})/I_{ave} (\%). \quad \text{Eq. 24}$$

The present inventor has found out that the experimental measurements correspond substantially to the simulations by actual ray tracing described above.

As shown in FIGS. 6 to 8, the light quantity irregularity fluctuates for each increase of 0.5 in the overlapping degree m, and this period do not depend on the angular aperture θ. The positional deviation of the image line in the sub-scanning direction does not affect the light quantity irregularity, as long as it is within 10% of the lens diameter d of the rod lens 1. The light quantity irregularity of the rod lens array 2 including the rod lenses 1 with a large angular aperture θ (see FIG. 8) is smaller than the other rod lens arrays. However, the values of the overlapping degree m at which each rod lens array has its maximum and minimum light quantity irregularities are constant regardless of the angular aperture θ.

According to the calculations shown in FIGS. 6 to 8, except for the range over which the light quantity irregularity is large or changes sharply, the overlapping degree m at which the periodic light quantity irregularity reaches a minimum is in the range defined by $$1.55 + 0.5j \leq m \leq 1.80 + 0.5j \quad \text{Eq. 25}$$

where j is zero or a positive integer. Equation 25 holds regardless of the angular aperture θ and the positional deviation of the image line in the sub-scanning direction.

Figure 10:
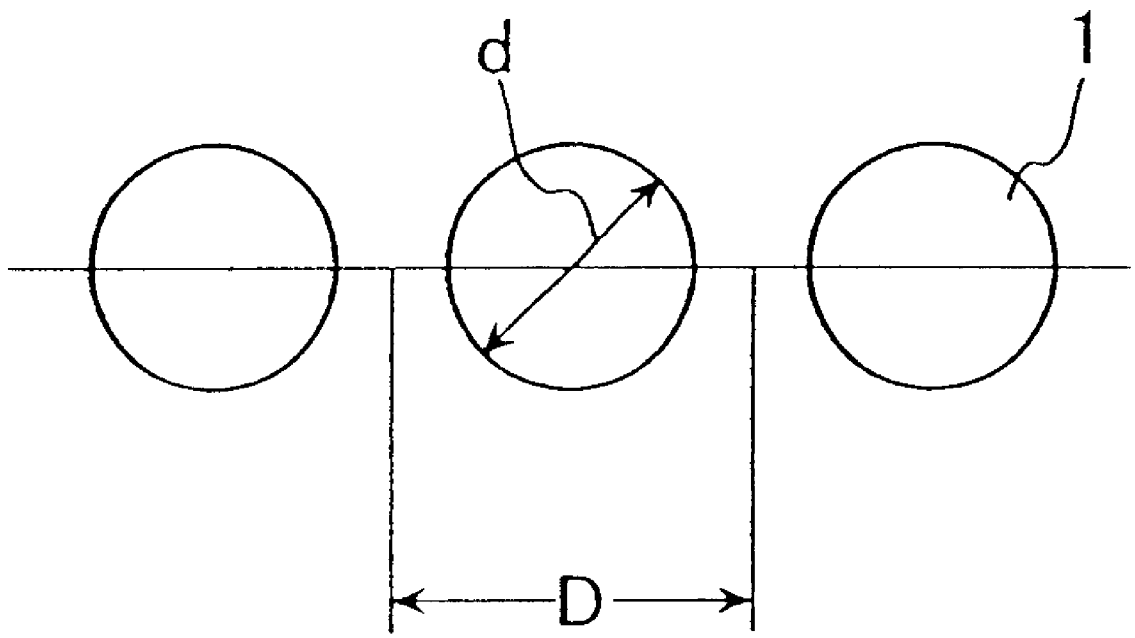
FIG. 10 schematically shows the relationship between the lens diameter d of a rod lens and the array pitch D of the rod lenses used in a rod lens array according to embodiments of the present invention.

Equation 25 is used when the rod lenses 1 are arranged by bringing the adjacent lenses into contact with each other. In the case where the rod lenses 1 are arranged with a space between the adjacent lenses, i.e., the lens diameter d ($=2r_0$) of the rod lens 1 is smaller than the array pitch D of the rod lenses 1 ($d \leq D$) as shown in FIG. 10, each value of the overlapping degree m is multiplied by D/d.

Thus, in the rod lens array 2 for line scanning including a plurality of rod lenses 1 having a refractive index distribution in the radial direction that are arranged in one row in the main scanning direction with their optical axes $1a$ in parallel, the degradation of image quality (i.e., vertical stripes (streaks) in the sub-scanning direction of an output image) caused by the periodic light quantity irregularity is reduced when the overlapping degree m is in the range defined by $$(1.55+0.5j)D/d \leq m \leq (1.80+0.5j) \, D/d \qquad \text{Eq. 26}$$

where d is the lens diameter of the rod lens 1, D is the array pitch of the rod lenses 1 and j is zero or a positive integer, and the overlapping degree m is given by m=$X_0$/d, where $X_0$ is the image radius that the single rod lens 1 projects onto the image plane 4.

Second Embodiment

Figure 11:
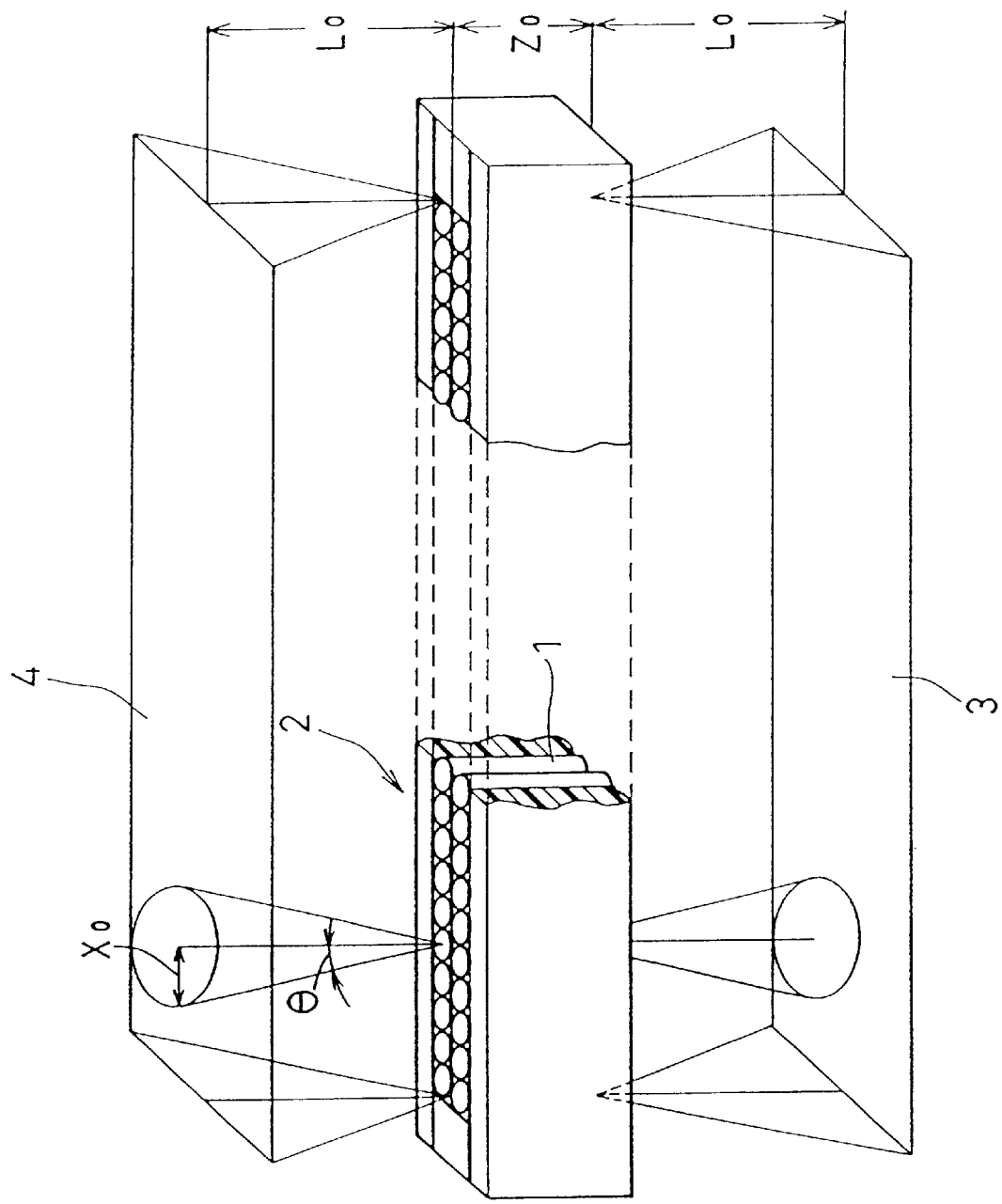
FIG. 11 is a perspective view showing a rod lens array for line scanning according to a second embodiment of the present invention.

FIG. 11 is a perspective view showing a rod lens array for line scanning according to a second embodiment of the present invention.

As shown in FIGS. 2 and 11, this embodiment employs a rod lens array 2 for one-to-one imaging as the rod lens array for line scanning. In the rod lens array 2, a plurality of columnar rod lenses 1 having a refractive index distribution in the radial direction are arranged in two rows in the main scanning direction with their optical axes 1a in parallel. The other configuration is the same as that in the first embodiment, and thus the explanation will be omitted.

In this embodiment, using the rod lens arrays 2 with the above configuration that include the rod lenses 1 having angular apertures θ of 12°, 17° and 20°, respectively, the present inventor calculated the periodic light quantity irregularity ΔE with respect to the overlapping degree m by actual ray tracing and made evaluations. According to the calculation, except for the range over which the light quantity irregularity is large or changes sharply, the overlapping degree m at which the periodic light quantity irregularity reaches a minimum is in the range defined by $$0.90+0.5j \leq m \leq 1.08+0.5j. \qquad \text{Eq. 28}$$

In this embodiment, each value of the overlapping degree m is also multiplied by D/d when there is a space between the adjacent rod lenses 1.

Thus, in the rod lens array 2 for line scanning including a plurality of rod lenses 1 having a refractive index distribution in the radial direction that are arranged in two rows in the main scanning direction with their optical axes 1a in parallel, the degradation of image quality (i.e., vertical stripes (streaks) in the sub-scanning direction of an output image) caused by the periodic light quantity irregularity is reduced when the overlapping degree m is in the range defined by $$(0.90+0.5j)D/d \leq m \leq (1.08+0.5j) \, D/d \qquad \text{Eq. 29}$$

where d is the lens diameter of the rod lens 1, D is the array pitch of the rod lenses 1 and j is zero or a positive integer, and the overlapping degree m is given by m=$X_0$/d, where $X_0$ is the image radius that the single rod lens 1 projects onto the image plane 4.

Third Embodiment

Figure 12:
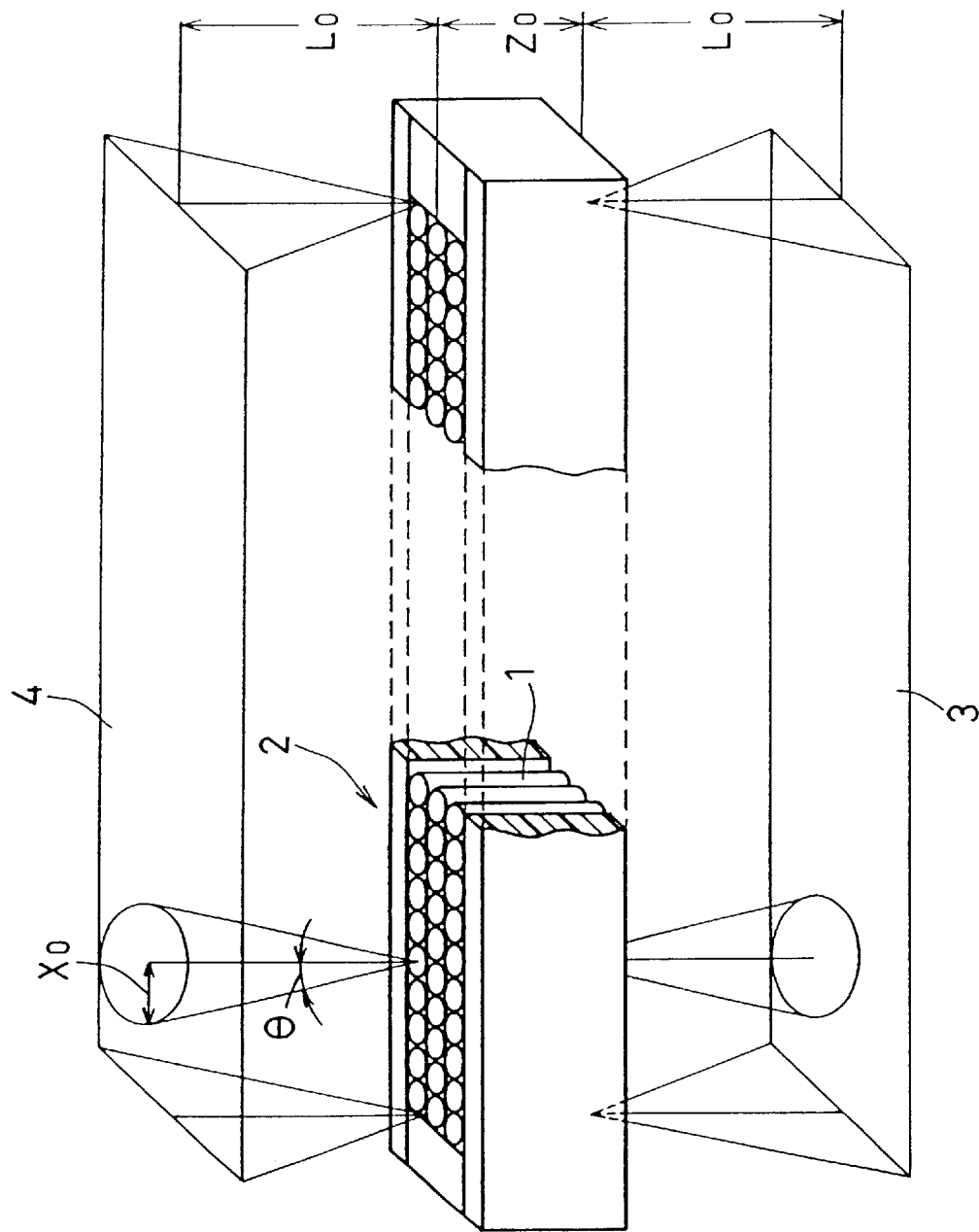
FIG. 12 is a perspective view showing a rod lens array for line scanning according to a third embodiment of the present invention.

FIG. 12 is a perspective view showing a rod lens array for line scanning according to a third embodiment of the present invention.

As shown in FIGS. 2 and 12, this embodiment employs a rod lens array 2 for one-to-one imaging as the rod lens array for line scanning. In the rod lens array 2, a plurality of columnar rod lenses 1 having a refractive index distribution in the radial direction are arranged in three rows in the main scanning direction with their optical axes 1a in parallel. The other configuration is the same as that in the first embodiment, and thus the explanation will be omitted.

In this embodiment, using the rod lens arrays 2 with the above configuration that include the rod lenses 1 having angular apertures θ of 12°, 17° and 20°, respectively, the present inventor calculated the periodic light quantity irregularity ΔE with respect to the overlapping degree m by actual ray tracing and made evaluations. According to the calculation, except for the range over which the light quantity irregularity is large or changes sharply, the overlapping degree m at which the periodic light quantity irregularity reaches a minimum is in the range defined by $$1.30+0.5j \leq m \leq 1.60+0.5j. \qquad \text{Eq. 29}$$

In this embodiment, each value of the overlapping degree m is also multiplied by D/d when there is a space between the adjacent rod lenses 1.

Thus, in the rod lens array 2 for line scanning including a plurality of rod lenses 1 having a refractive index distribution in the radial direction that are arranged in three rows in the main scanning direction with their optical axes 1a in parallel, the degradation of image quality (i.e., vertical stripes (streaks) in the sub-scanning direction of an output image) caused by the periodic light quantity irregularity is reduced when the overlapping degree m is in the range defined by $$(1.30+0.5j)D/d \leq m \leq (1.60+0.5j) \, D/d \qquad \text{Eq. 30}$$

where d is the lens diameter of the rod lens 1, D is the array pitch of the rod lenses 1 and j is zero or a positive integer, and the overlapping degree m is given by m=$X_0$/d, where $X_0$ is the image radius that the single rod lens 1 projects onto the image plane 4.

As described above, according to the first, second or third embodiment, the range of the effective overlapping degree m is defined so as to minimize the periodic light quantity irregularity, except for the range over which the light quantity irregularity is large or changes sharply, while considering an angular aperture and the positional deviation of an image line in the sub-scanning direction. Thus, it is possible to provide a rod lens array for line scanning that reduces the degradation of image quality (i.e., vertical stripes (streaks) in the sub-scanning direction of an output image) caused by the periodic light quantity irregularity.

Fourth Embodiment

This embodiment employs a rod lens array 2 for one-to-one imaging as a rod lens array for line scanning. In the rod lens array 2, like the second embodiment, a plurality of columnar rod lenses 1 having a refractive index distribution in the radial direction are arranged in two rows in the main scanning direction with their optical axes 1a in parallel (see FIGS. 2 and 11). The other configuration is the same as that in the first embodiment, and thus the explanation will be omitted.

Figure 13:
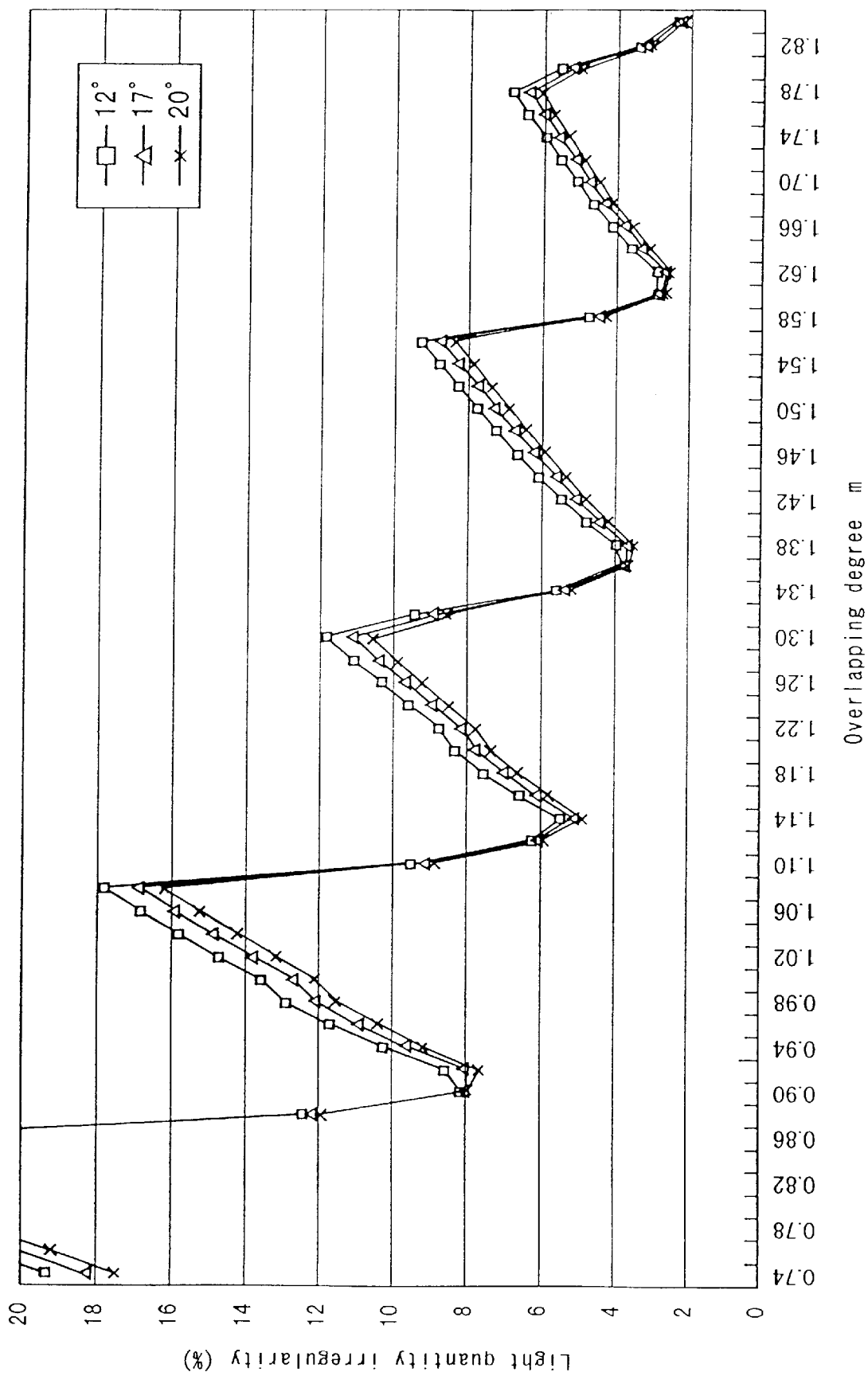
FIG. 13 shows the calculation of the periodic light quantity irregularity of a rod lens array for line scanning according to a fourth embodiment of the present invention.

Using the rod lens arrays 2 with the above configuration that include the rod lenses 1 having angular apertures θ of 12°, 17° and 20°, respectively, the present inventor calculated the periodic light quantity irregularity ΔE with respect to the overlapping degree m by actual ray tracing and made evaluations. FIG. 13 shows the results.

The effective overlapping degree m with which the periodic light quantity irregularity can be suppressed to less than 10% is shown in Table 1, based on the calculation in FIG. 13. As shown in FIG. 13, the periodic light quantity irregularity repeats fluctuations with the overlapping degree m and tends to decrease as the overlapping degree m increases. However, the brightness of lenses is reduced and the resolution is degraded with an increase in the overlapping degree m. Therefore, the ranges of the effective overlapping degree m are defined so that the periodic light quantity irregularity is less than 10% in the range of smaller overlapping degree m.

TABLE 1

| Angular aperture (the maximum angle of incidence) | Range of effective overlapping degree m |
|---|---|
| 12° | 0.89–0.93, 1.10–1.25 |
| 17° | 0.89–0.94, 1.10–1.27 |
| 20° | 0.89–0.95, 1.10–1.28 |

Table 1 shows the calculation carried out when the rod lenses 1 are arranged by bringing the adjacent lenses into contact with each other. In the case where the rod lenses 1 are arranged with a space between the adjacent lenses, i.e., the lens diameter d ($=2r_0$) of the rod lens 1 is smaller than the array pitch D of the rod lenses 1 ($d \leq D$) as shown in FIG. 10, each value of the overlapping degree m is multiplied by D/d. Specifically, for the rod lenses 1 with an angular aperture θ of 12°, the effective overlapping degree m is in the ranges of $$0.89D/d \leq m \leq 0.93D/d$$

and $$1.10D/d \leq m \leq 1.25D/d.$$

Table 1 shows two ranges of the effective overlapping degree m (e.g., the rod lens array 2 for line scanning including the rod lenses 1 with an angular aperture θ of 12° has a first range of 0.89 to 0.93 and a second range of 1.10 to 1.25).

When the overlapping degree m is smaller than the first range, the periodic light quantity irregularity is 10% or more. Therefore, the first range can provide the periodic light quantity irregularity of less than 10% as well as the highest brightness and resolution of lenses. However, the use of the rod lenses 1 having a particularly small angular aperture θ makes the first range considerably narrower, so that there is some difficulty in setting the effective overlapping degree m. Thus, the second range is defined as the range of the effective overlapping degree m. Since the second range is about three times broader than the first range, the effective overlapping degree m can be set easily.

As described above, the periodic light quantity irregularity repeats fluctuations periodically with an increase in the overlapping degree m. Such irregularity becomes small when the overlapping degree m is greater than the second range. For example, this corresponds to the overlapping degree m ranging from 1.31 to 1.54, as shown in FIG. 13. However, the overlapping degree m in that range is not effective because the brightness of lenses is reduced to about 70% of the first range.

In this embodiment, the range of the effective overlapping degree m is defined so that the periodic light quantity irregularity is less than 10% in the range of smaller overlapping degree m. Therefore, the angle of incidence in the sub-scanning direction (i.e., the direction perpendicular to the main scanning direction) is increased and the shading of the effective bundle of rays is reduced. Consequently, a bright rod lens array 2 can be achieved. Moreover, a decrease in the overlapping degree m reduces the conjugate length $$(TC = Z_0 + 2L_0)$$

and the aberration of light rays, so that the resolution can be improved. Moreover, such a reduction in the conjugate length (TC) diminishes the shift of an image point relative to a slope of the rod lens array 2, thus increasing the tolerance of a slope in the rod lenses 1 (i.e., alignment accuracy).

As described above, in the rod lens array 2 for line scanning including a plurality of rod lenses 1 having a refractive index distribution in the radial direction that are arranged in two rows in the main scanning direction with their optical axes 1a in parallel, high brightness and resolution as well as the periodic light quantity irregularity of less than 10% can be achieved when the overlapping degree m is in the ranges defined by $$0.89D/d \leq m \leq 0.95D/d \qquad \text{Eq. 31}$$

$$1.10D/d \leq m \leq 1.28D/d \qquad \text{Eq. 32}$$

where d is the lens diameter of the rod lens 1 and D is the array pitch of the rod lenses 1, and the overlapping degree m is given by $m = X_0/d$, where $X_0$ is the image radius that the single rod lens 1 projects onto the image plane.

In this embodiment, the rod lens array 2 for one-to-one imaging is used as a rod lens array for line scanning, including a plurality of columnar rod lenses 1 having a refractive index distribution in the radial direction that are arranged in two rows in the main scanning direction with their optical axes 1a in parallel. However, even if a rod lens array for one-to-one imaging including a plurality of rod lenses that are arranged in an even number of rows of more than one is used, it can provide high brightness and resolution and suppress the periodic light quantity irregularity to less than 10% when the overlapping degree m is in the ranges defined by Equations 31 and 32. The reason for this is considered to be as follows: light is not incident substantially on the rod lenses located outside when the overlapping degree m is small.

Fifth Embodiment

This embodiment employs a rod lens array 2 for one-to-one imaging as a rod lens array for line scanning. In the rod lens array 2, like the first embodiment, a plurality of columnar rod lenses 1 having a refractive index distribution in the radial direction are arranged in one row in the main scanning direction with their optical axes 1a in parallel (see FIGS. 1 and 2). The other configuration is the same as that in the first embodiment, and thus the explanation will be omitted.

Figure 14:
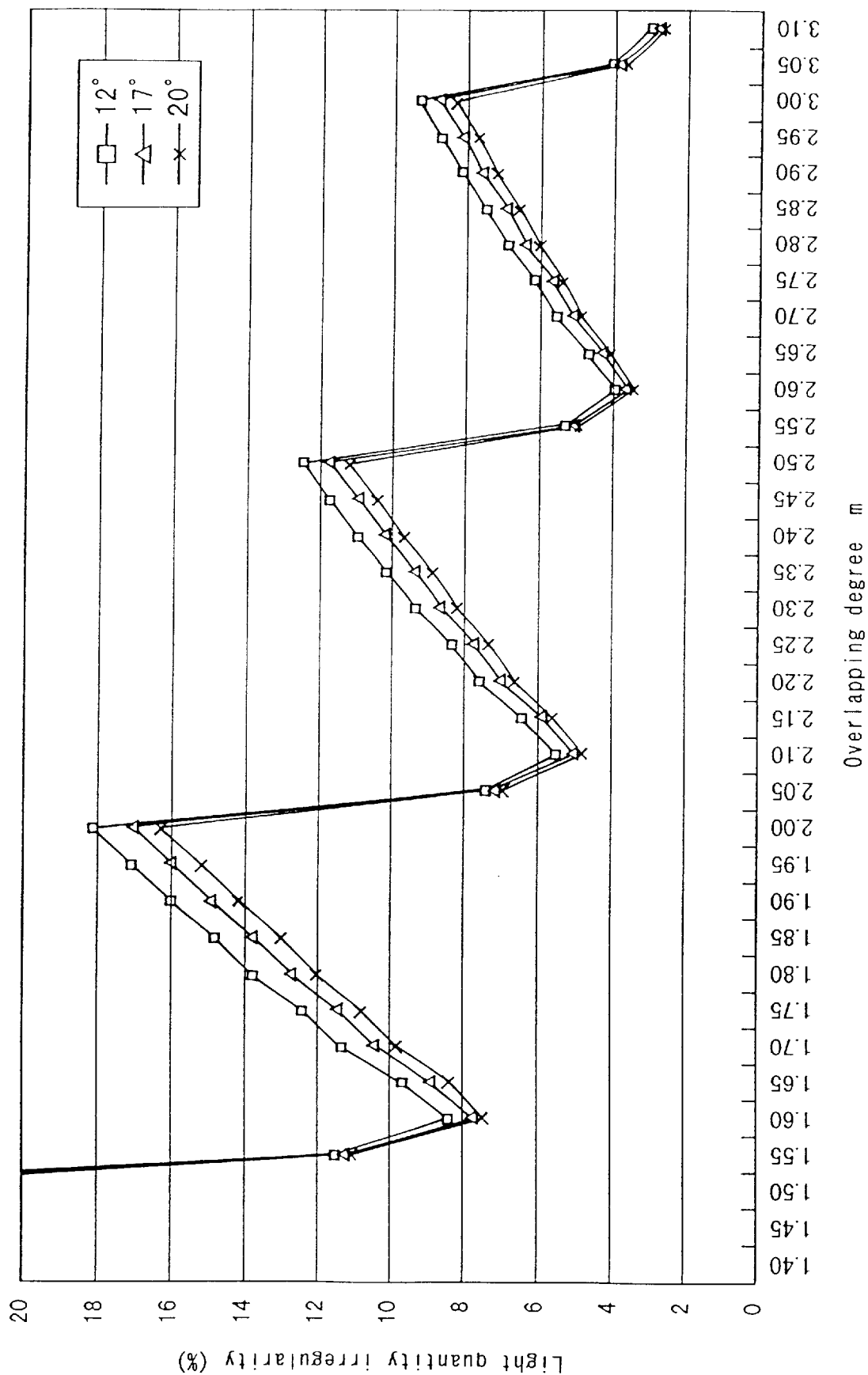
FIG. 14 shows the calculation of the periodic light quantity irregularity of a rod lens array for line scanning according to a fifth embodiment of the present invention.

In this embodiment, using the rod lens arrays 2 with the above configuration that include the rod lenses 1 having angular apertures θ of 12°, 17° and 20°, respectively, the present inventor calculated the periodic light quantity irregularity ΔE with respect to the overlapping degree m by actual ray tracing and made evaluations. FIG. 14 shows the results.

The effective overlapping degree m with which the periodic light quantity irregularity can be suppressed to less than 10% is shown in Table 2, based on the calculation in FIG. 14.

TABLE 2

| Angular aperture (the maximum angle of incidence) | Range of effective overlapping degree m |
| --- | --- |
| 12° | 1.57–1.65, 2.04–2.34 |
| 17° | 1.57–1.68, 2.04–2.38 |
| 20° | 1.57–1.70, 2.04–2.42 |

In this embodiment, each value of the overlapping degree m is also multiplied by D/d when there is a space between the adjacent rod lenses 1.

As described above, in the rod lens array 2 for line scanning including a plurality of rod lenses 1 having a refractive index distribution in the radial direction that are arranged in one row in the main scanning direction with their optical axes 1a in parallel, high brightness and resolution as well as the periodic light quantity irregularity of less than 10% can be achieved when the overlapping degree m is in the ranges defined by $$1.57 D/d \leq m \leq 1.70 D/d \qquad \text{Eq. 33}$$

$$2.04 D/d \leq m \leq 2.42 D/d \qquad \text{Eq. 34}$$

where d is the lens diameter of the rod lens 1 and D is the array pitch of the rod lenses 1, and the overlapping degree m is given by $m = X_0/d$, where $X_0$ is the image radius that the single rod lens 1 projects onto the image plane.

Sixth Embodiment

This embodiment employs a rod lens array 2 for one-to-one imaging as a rod lens array for line scanning. In the rod lens array 2, like the third embodiment, a plurality of columnar rod lenses 1 having a refractive index distribution in the radial direction are arranged in three rows in the main scanning direction with their optical axes 1a in parallel (see FIGS. 2 and 12). The other configuration is the same as that in the first embodiment, and thus the explanation will be omitted.

Figure 15:
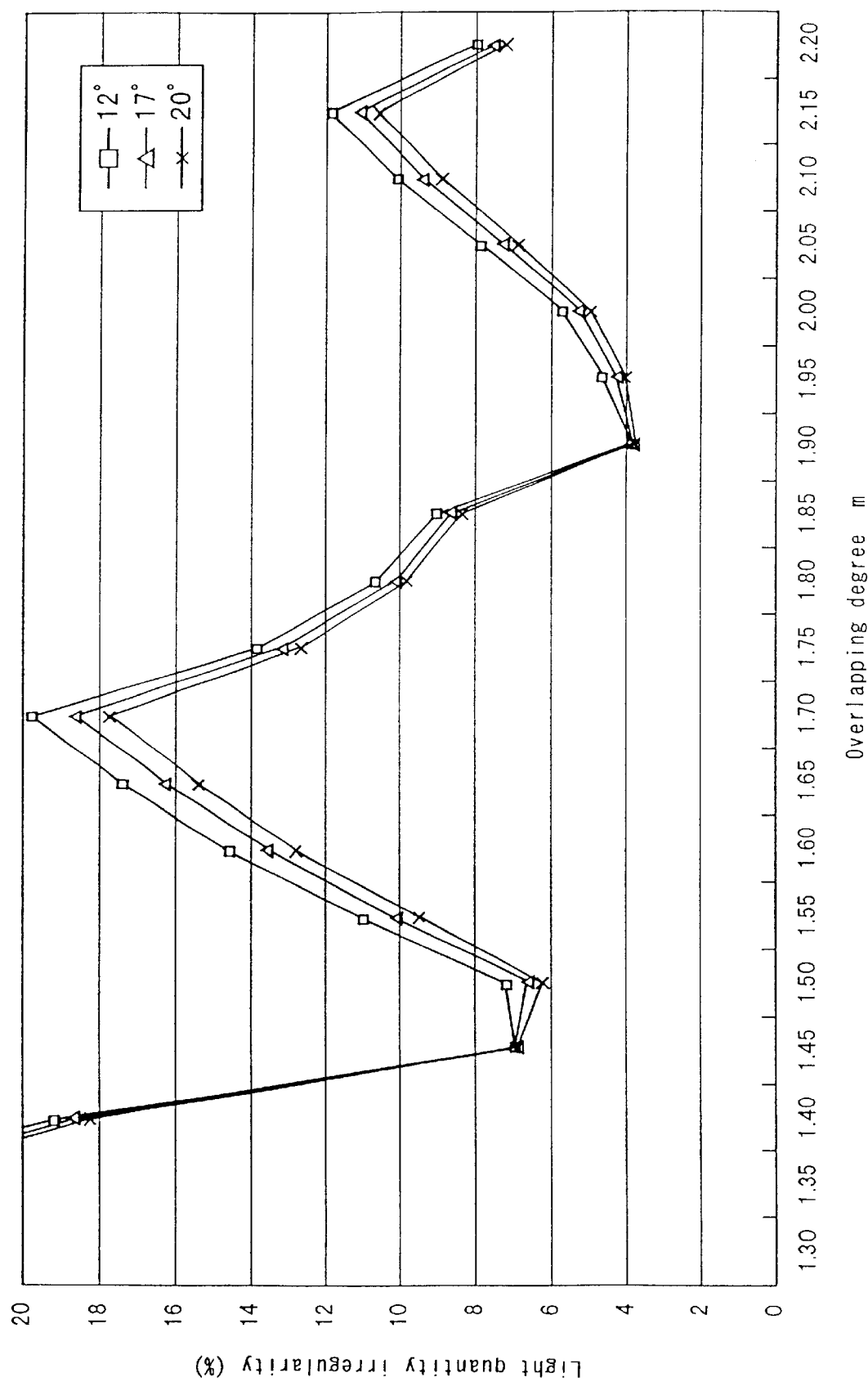
FIG. 15 shows the calculation of the periodic light quantity irregularity of a rod lens array for line scanning according to a sixth embodiment of the present invention.

In this embodiment, using the rod lens arrays 2 with the above configuration that include the rod lenses 1 having angular apertures θ of 12°, 17° and 20°, respectively, the present inventor calculated a periodic irregularity in the light quantity ΔE with respect to the overlapping degree m by actual ray tracing and made evaluations. FIG. 15 shows the results.

The effective overlapping degree m with which the periodic light quantity irregularity can be suppressed to less than 10% is shown in Table 3, based on the calculation in FIG. 15.

TABLE 3

| Angular aperture (the maximum angle of incidence) | Range of effective overlapping degree m |
| --- | --- |
| 12° | 1.44–1.54, 1.82–2.10 |
| 17° | 1.44–1.55, 1.81–2.12 |
| 20° | 1.44–1.56, 1.80–2.13 |

In this embodiment, each value of the overlapping degree m is also multiplied by D/d when there is a space between the adjacent rod lenses 1.

As described above, in the rod lens array 2 for line scanning including a plurality of rod lenses 1 having a refractive index distribution in the radial direction that are arranged in three rows in the main scanning direction with their optical axes 1a in parallel, high brightness and resolution as well as the periodic light quantity irregularity of less than 10% can be achieved when the overlapping degree m is in the ranges defined by $$1.44 D/d \leq m \leq 1.56 D/d \qquad \text{Eq. 35}$$

$$1.80 D/d \leq m \leq 2.13 D/d \qquad \text{Eq. 36}$$

where d is the lens diameter of the rod lens 1 and D is the array pitch of the rod lenses 1, and the overlapping degree m is given by $m = X_0/d$, where $X_0$ is the image radius that the single rod lens 1 projects onto the image plane.

In this embodiment, the rod lens array 2 for one-to-one imaging is used as a rod lens array for line scanning, including a plurality of columnar rod lenses 1 having a refractive index distribution in the radial direction that are arranged in three rows in the main scanning direction with their optical axes 1a in parallel. However, even if a rod lens array for one-to-one imaging including a plurality of rod lenses that are arranged in an odd number of rows more of than two is used, it can provide high brightness and resolution and suppress the periodic light quantity irregularity to less than 10% when the overlapping degree m is in the ranges defined by Equations 35 and 36. The reason for this is considered to be as follows: light is not incident substantially on the rod lenses located outside when the overlapping degree m is small.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A rod lens array for line scanning comprising:
   a plurality of rod lenses having a refractive index distribution in a radial direction that are arranged in one row in a main scanning direction with their optical axes in parallel,
   wherein an overlapping degree m is in a range defined by $$(1.55 + 0.5j) D/d \leq m \leq (1.80 + 0.5j) D/d \qquad \text{Eq. 1}$$

where d is a lens diameter of the rod lenses, D is an array pitch of the rod lenses and j is zero or a positive integer, and the overlapping degree m is given by $m = X_0/d$, where $X_0$ is an image radius that a single rod lens projects onto an image plane.

2. A rod lens array for line scanning comprising:
   a plurality of rod lenses having a refractive index distribution in a radial direction that are arranged in two rows in a main scanning direction with their optical axes in parallel,
   wherein an overlapping degree m is in a range defined by $$(0.90 + 0.5j) D/d \leq m \leq (1.08 + 0.5j) D/d \qquad \text{Eq. 2}$$

where d is a lens diameter of the rod lenses, D is an array pitch of the rod lenses and j is zero or a positive integer, and the overlapping degree m is given by $m = X_0/d$, where $X_0$ is an image radius that a single rod lens projects onto an image plane.

3. A rod lens array for line scanning comprising:

a plurality of rod lenses having a refractive index distribution in a radial direction that are arranged in three rows in a main scanning direction with their optical axes in parallel, wherein an overlapping degree m is in a range defined by $$(1.30+0.5j) D/d \leq m \leq (1.60+0.5j) D/d \qquad \text{Eq. 3}$$

where d is a lens diameter of the rod lenses, D is an array pitch of the rod lenses and j is zero or a positive integer, and the overlapping degree m is given by $m=X_0/d$, where $X_0$ is an image radius that a single rod lens projects onto an image plane.

4. A rod lens array for line scanning comprising:

a plurality of rod lenses having a refractive index distribution in a radial direction that are arranged in one row in a main scanning direction with their optical axes in parallel, wherein an overlapping degree m is in ranges defined by $$1.57D/d \leq m \leq 1.70D/d \qquad \text{Eq. 4}$$

$$2.04D/d \leq m \leq 2.42D/d \qquad \text{eq. 5}$$

where d is a lens diameter of the rod lenses and D is an array pitch of the rod lenses, and the overlapping degree m is given by $m=X_0/d$, where $X_0$ is an image radius that a single rod lens projects onto an image plane.

5. A rod lens array for line scanning comprising:

a plurality of rod lenses having a refractive index distribution in a radial direction that are arranged in an even number of rows of more than one in a main scanning direction with their optical axes in parallel, wherein an overlapping degree m is in ranges defined by $$0.89D/d \leq m \leq 0.95D/d \qquad \text{Eq. 6}$$

$$1.10D/d \leq m \leq 1.28D/d \qquad \text{Eq. 7}$$

where d is a lens diameter of the rod lenses and D is an array pitch of the rod lenses, and the overlapping degree m is given by $m=X_0/d$, where $X_0$ is an image radius that a single rod lens projects onto an image plane.

6. A rod lens array for line scanning comprising:

a plurality of rod lenses having a refractive index distribution in a radial direction that are arranged in an odd number of rows of more than two in a main scanning direction with their optical axes in parallel, wherein an overlapping degree m is in ranges defined by $$1.44D/d \leq m \leq 1.56D/d \qquad \text{Eq. 8}$$

$$1.80D/d \leq m \leq 2.13D/d \qquad \text{Eq. 9}$$

where d is a lens diameter of the rod lenses and D is an array pitch of the rod lenses, and the overlapping degree m is given by $m=X_0/d$, where $X_0$ is an image radius that a single rod lens projects onto an image plane.

* * * * *